United States Patent [19]

Head

[11] 3,972,694
[45] Aug. 3, 1976

[54] FILTER TUBE
[75] Inventor: Brian Arthur Head, Chatham, England
[73] Assignee: Whatman Reeve Angel Limited, Maidstone, England
[22] Filed: Nov. 14, 1974
[21] Appl. No.: 523,587

[52] U.S. Cl. ............................ 55/97; 55/524; 55/527; 156/329; 210/504; 210/505; 210/509
[51] Int. Cl.² ............................................ B01D 46/00
[58] Field of Search ............ 210/65, 496, 497, 504, 210/505, 506, 508, 85, 94, 502, 509; 55/524, 527, 97; 162/156; 156/325, 329, 62.4, 62.6

[56] References Cited
UNITED STATES PATENTS

| | | | |
|---|---|---|---|
| 3,246,758 | 4/1966 | Wagner | 210/94 |
| 3,252,270 | 5/1966 | Pall et al. | 210/502 |
| 3,355,018 | 11/1967 | Smith | 210/94 |
| 3,375,201 | 3/1968 | Winyall | 210/502 |
| 3,395,071 | 7/1968 | Nitzche et al. | 162/156 |
| 3,416,985 | 12/1968 | Dounoucos | 156/329 |
| 3,429,757 | 2/1969 | Nash | 156/329 |
| 3,436,352 | 4/1969 | Revoir et al. | 210/502 |
| 3,492,396 | 1/1970 | Dalton et al. | 210/94 |
| 3,521,429 | 7/1970 | Leffler | 55/524 |
| 3,535,852 | 10/1970 | Hirs | 55/527 |
| 3,681,161 | 8/1972 | Wood | 156/329 |
| 3,687,850 | 8/1972 | Gagin | 162/156 |
| 3,767,054 | 10/1973 | Farrow et al. | 210/497 |
| 3,883,435 | 5/1975 | Englebrecht | 210/502 |
| 3,891,417 | 6/1975 | Wade | 55/527 |

FOREIGN PATENTS OR APPLICATIONS

| | | | |
|---|---|---|---|
| 870,715 | 8/1959 | United Kingdom | 156/329 |
| 630,199 | 5/1946 | United Kingdom | 156/329 |

*Primary Examiner*—Charles N. Hart
*Assistant Examiner*—Ernest G. Therkorn
*Attorney, Agent, or Firm*—Richard P. Crowley

[57] ABSTRACT

A filter tube, which filter tube comprises a mass of interrelated nonwoven glass fibers, the fibers having a diameter of from about 0.001 to about 10 microns, the fibers bonded at the junctions of the fiber crossovers with a hardened silicone resin bonding agent, the fibers interrelated to form a semirigid mass of desired porosity suitable for use as a filter for gases or liquids.

11 Claims, No Drawings

FILTER TUBE

BACKGROUND OF THE INVENTION

In various processes requiring the filtration of a gas or liquid stream, filters composed of woven or nonwoven fibers are often employed, either alone in flat sheet or tubular form or supported by a suitable porous support. In the selection of such filters for a particular application, one characteristic relates to the efficiency, flow rate and life of the filter. These criteria typically depend upon the particular properties of the material of which the fiber is composed, but more particularly, are related to the particular diameter of the fibers used. Another important criteria is an environmental one as to whether the filters will withstand the particular pressures, temperatures and physical nature of the gas or liquid material to be filtered.

As to this latter criteria, filters made from organic material are quite susceptible to pressure, temperature and the chemical nature of the gas or liquid to be filtered. Filters made from glass fibers have been employed where the glass fibers are formed into an interlaced mass of the glass fibers without any physical coherency or strength; that is, without a binder to retain the glass fibers in a coherent manner. Although such glass fibers have good temperature and chemical resistance, the physical strength of such fibers is quite low, and such fibers may only be used in most undemanding applications. The filters must, therefore, be treated with a great deal of care by the user in order that they remain as useful filters.

The lack of strength of such glass fibers has been overcome by bonding the glass fibers with suitable organic bonding agents. The bonding agents may typically be phenol-formaldehyde or epoxy resins or other thermosetting-type resins with which the mass of typically interrelated nonwoven glass fibers are impregnated during the formation process of the fibers into their particular form or thereafter. However, the chemical and temperature resistance of the filter so prepared is modified by the employment of such bonding agents. Typically an epoxy resin is used which provides good strength and fairly high-temperature and chemical resistance to a self-supporting nonwoven tubular fiber filter. Such filter tubes are described more particularly in U.S. Pat. 3,767,054, issued Oct. 23, 1973. Although such epoxy resin glass fiber filter tubes are suitable for many uses, the organic bonding agent restricts the scope of the filter applications available, particularly since the maximum temperature of use of such tubes is not over 200°C. In addition, such filter tubes are not very resistant to degradation in use with many liquids, such as concentrated acids. Furthermore, such filter tubes, due to the presence of the organic resinous bonding agent, often have an offwhite-to-light-brown color which darkens with age and sunlight due to the presence of such bonding agent. Thus, such filters may not be employed where a color indicator is employed with the filter, or where a white color is desirable.

SUMMARY OF THE INVENTION

My invention concerns filters and the method of preparing such filters and using such filters. In particular, my invention relates to an improved nonwoven fibrous filter tube composed of inorganic fibers, particularly glass fibers with a hardened silicone resin as a bonding agent. My improved filters may be used in steam filtration applications, have improved resistance to acids, and are characterized by a light white color and high hydrophobicity.

My invention provides a filter tube composed of glass fibers, which filter tube is similar or better in filtration properties; e.g., flow rate and efficiency, as prior art filters with epoxy resin as a bonding agent, but of different physical properties which permit my filter tubes to be employed in demanding uses not possible by such epoxy resin tubes. My filters, which are composed of inorganic fibers interrelated in a nonwoven, randomly disposed pattern defining interstices of desired porosity therebetween, and bonded together into a self-supporting coherent mass or form, such as a tube, with hardened silicone resin binder, have improved temperature resistance, good color, improved resistance to concentrated acids, and are more hydrophobic than epoxy resinbonded filters.

My invention provides for a mat, or mass in desired form, of interplaced, overlapping or interrelated inorganic fibers having various diameters; for example, having a diameter from about 0.001 to about 10 microns; for example, 0.03 to 8 microns, such as 0.1 to 5.0 microns, bonded together by a hardened crosslinked silicone resin binder.

A wide variety of fibers, but particularly inorganic fibers, may be employed in preparing the self-supporting filters of my invention. However, particular types of inorganic fibers that are suitable for the fibers in my invention are, for example, preferably glass fibers, particularly borosilicate glass fibers, alumina fibers, zirconia fibers and the like and combinations thereof.

The treatment of the fibers with the silicone resin bonding agent, particularly where the hardenable resin is applied to the fiber mass as a liquid or silicone resin solution, such as by immersion, also costs the fiber surface, and with the resin at the crossover junctions, imparts hydrophobicity to the filter. The filters are bonded together generally at junctions wherein the fibers cross or contact each other in the particular form by the hardened or rigid silicone resin agent.

The term "hardened silicone resin" is employed to define a silicone-type resin material containing a plurality of SiO groups as a backbone of the polymer chain, such as a silicone resin prepolymer prepared by the cohydrolyzing of organochlorosilanes and mixtures, to form a resin high in silanol groups ($=SiOH$). The resin is partially condensed to form a polysiloxane prepolymer with a few silanol groups. The solvent soluble resin, on the application of heat and/or a catalyst, or preferably both, is then condensed further, polymerized or reacted to form a cured or crosslinked thermoset polysiloxane resin. Typically, the by-product of the condensation reaction is water. The silicone resin is composed then of cross-linked Si-O- bonds. Other suitable hardenable silicone resins include silicone elastomers which are either one or two-component systems curable at room temperatures, or at slightly elevated temperatures, and flexible silicone resins typically derived from dimethylpolysiloxane. The rigid elastomers and flexible resins are described more particularly in "Modern Plastics Encyclopedia", Vol. 50 No. 10A, October 1973, pages 102 and 107, hereby incorporated by reference.

Such hardenable silicone resins are well-known and commercially available. The silicone resin is typically supplied in liquid or solvent-containing form and is hardened into a semirigid or rigid resin which normally is solvent-resistant, thermosetting, white in color and hydrophobic in properties. A wide variety of silicone resins may be employed as bonding agents, such as those silicone resins which are elastomers, coating resins, or foamable resins.

My filter may be treated with the liquid resin, or more preferably and easier with the silicone resin, in a suitable volatile organic solvent. The solution may contain typically 2 to 50%; e.g., 5 to 20%, by weight of the silicone resin. The solvents selected for the solution should be those solvents which may be removed by evaporation, such as low-boiling-point organic liquids; e.g., less than 100°C. Preferred solvents include, but are not limited to, low-boiling organic ketones like acetone, and methyl ethyl ketone, and halocarbons like halohydrocarbons such as 1,1,1-trichloroethane, carbon tetrachloride, and fluoro and chloro derivatives of methane, ethane and propane; e.g., the Freons (a trademark of DuPont de Nemours & Co.), or combinations thereof. Suitable diluents, such as hydrocarbons, alcohols, esters, ethers, etc., may also be used.

The silicone resins are crosslinked into a rigid three-dimensional structure by the use of elevated temperatures; for example, over 100°C, and typically 150° to 250°C, for times of 5 minutes to several hours; e.g., ½ to 2 hours. Various additives may be employed as desired with the silicone resin, but normally a catalyst or combination of catalysts or compounds are employed in micro amounts to speed up the cure time, the hardness of the resin, or to reduce the cure temperature or increase resin heat life. Such catalysts are well-known and include various organometallic compounds; for example, metals of zinc, cobalt, manganese, and tin, with oil-soluble fatty acids and naphthenatic anions as well as various amine compounds. Some such catalysts include, but are not limited to, zinc octoate, zinc naphthenate, cobalt and manganese octoates and naphthenates, amines such as choline octoate, dibutyl tin dilaurate, etc. The catalysts are employed in very low amounts; for example, 0.01 to about 2.0% by weight of the silicone resin, such as 0.1 to 1.0% by weight of the metal on the silicone resin solids.

My invention is also directed to a method of preparing my improved filters and the use of such filters in filtering processes. The method of preparing such filters comprises dispersing the particular fibers or combinations thereof in an aqueous solution; forming the fibers into a particularly desired, randomly disposed configuration to form interstices of desired porosity, the fibers typically in flat sheet or preferably in tubular form to form a mat of interrelated nonwoven fibers; and drying the fibers so formed. In one embodiment, my method comprises dispersing inorganic fibers, such as borosilicate glass fibers, in an aqueous solution; forming a flat sheet or tubular mat of nonwoven interrelated fibers; impregnating the matted fibers with the hardenable silicone resin bonding agent; and drying the impregnated matted fibers to provide the improved coherent unitary filters of my invention.

The filters of my invention are prepared in the same manner as epoxy resin filters. For example, glass fibers are dispersed in an aqueous solution. In the preparation of a tubular filter, a wet matted tube of glass fibers is formed onto a tubular porous mandrel by immersing the mandrel into the glass fiber dispersion, and, for example, removing water by draining or preferably with the aid of a vacuum attached to the interior of the mandrel. Typically, the mandrel may be of stainless steel mesh having holes covered with a woven stainless steel wire.

In one embodiment, the filber tubes so prepared are integral, unitary, self-supporting tubes having crushable ends to form, by the axial compression of the fibers at or near the ends, a peripheral seal so that sealing gaskets need not be employed.

In the method of producing my filters, another water-soluble binder may be introduced in small amounts into the aqueous dispersion of the inorganic fibers, such as a silica sol, so that the fibers may be keyed together prior to the further stage of the bonding with the silicone resin bonding agent. Preferably the fibers are formed without the use of a bonding agent, and the nonwoven fibers after drying are subsequently impregnated with the desired silicone resin solution.

In general, a solution of silicone resin is employed to provide for about 3 to 50%; e.g., 5 to 40%, by weight of the resin of the filter. The glass fiber dispersion containing the organic binder is maintained to keep the glass fibers in optimum condition for the mutual bonding of the glass fibers to one another.

Once the inorganic fiber mat has been formed as described, the material is then dried in a steam oven or similar drying apparatus to provide a dried filter tube. Impregnation of the binder material onto the nonwoven mass of fibers is then accomplished by treating the dried filter with the silicone resin binder. For example, the dried filter is impregnated with the liquid silicone resin by immersing, spraying, coating, or otherwise treating the tube with a solution, dispersion, emulsion, or bulk liquid resin.

In the preferred embodiment, the dried filter tube is immersed in a volatile organic solvent-containing silicone resin solution. The tube is then gently heated to remove the solvent and the tube then heated to a temperature, for example, 100° to 200°C, and for a time sufficient to cross-link and cure the silicone resin.

The filters prepared in accordance with my invention may, of course, take any form; for example, in the form of flat sheets, discs or tubes. In the case of tubes of glass fibers in particular, such tubes are self-supporting and self-gasketing; i.e., the fibers at the end of the tube are compressible to form a seal, and often no gasketing or sealing is necessary to connect the filter tubes to the manifold. If desired, the filter tubes may be used alone or may be used in conjunction with a porous support sheet or filter core, or a filter assembly comprising an external housing, with means to admit a fluid into or withdraw a fluid from the housing and the interior of the tube.

My invention will be described for the purposes of illustration only, and in particular in connection with the preparation of a self-supporting semirigid borosilicate glass fiber silicone resin-bonded tube.

DESCRIPTION OF THE EMBODIMENTS

A filter tube is prepared by adding a volume of water to a beater, and while circulating the water, adding a quantity of the borosilicate glass microfibers to disperse the fibers. Filter tubes are formed by introducing a vacuum-type mandrel into the furnish to form a wet mass of nonwoven microfibers on the mandrel surface of the desired thickness. After formation, the tubes are then racked and dried at a temperature of from about 70 to 90°C. The dried tube is then immersed in a silicone resin solution composed of approximately 7% by weight of a curable polysiloxane resin (I.C.I. resin R 282 resin) with 0.5% zinc catalyst as a curing agent in a solution of methyl ethyl ketone. The immersed tube is removed, the solvent evaporated, and then the tube is cured at 200°C for about one hour. The dried tubes are then cut to the desired length for use. The resulting dried filter tube of my invention is composed of approximately 75% borosilicate glass microfibers and 25% silicone resin binder.

My tubes so prepared can be used for steam filtration applications, since they have good chemical resistance to steam. Steam of up to 100 psig (168°C) can be filtered for thirty 10-minute cycles during which flow is reduced from full (to atmosphere) to minimum, with only minor strength reduction (25%).

A comparison of the steam resistance of my tubes and standard epoxy resin tubes prepared in the same manner showed that after a steam cycle of 20 psi for 20 minutes, the strength of standard tubes was 30% of original, while my silicone tubes were 90% of original.

The superior resistance to steam makes my tubes superior for sterile air filters which must be sterilized by steam. In addition, the markedly increased hydrophobicity of my filter gives reduced condensate retention and higher flow capacities post steaming.

The reduced condensate retention of my tubes was demonstrated by steaming a standard tube and my tube of the same grade for 20 minutes at 20 psig. Immediately after steaming, air was passed through each tube at 80 l.p.m. and the pressure differential across the filter plotted against time. The pressure differential across my tube was increased 67% by condensate retention and then fell steadily to 6.7% after 30 minutes. By comparison, the pressure differential across a standard tube was initially increased 217% and then fell to 83% after 30 minutes.

My silicone resin tubes show a marked increase in their resistance to degradation by strong acids, and, therefore, can be used for the filtration of such chemicals.

|  | Initial collapse strength (psi) | Collapse strength after 72 hr. soak in 10% HCl. (psi) | Collapse strength after 72 hr. soak in 50% HNO$_3$ (psi) |
| --- | --- | --- | --- |
| Standard tube | 29.5 | 19.5 | 9.5 |
| My tube of Example | 27 | 32 | 29 |

The silicone resin is white in color and produces white tubes which are color-stable, unlike standard tubes. Standard tubes vary from off-white to brown or green on long exposure to sunlight. This color instability of standard tubes makes them unsuitable for use as outer porous sleeves in composite filter elements which incorporate a color indicator mechanism; e.g., an absorbent activated carbon-filled cartridge incorporating an organic soluble dye to indicate the presence of liquid oil. When the dyed oil appears at the outer filter sleeve, its color can be masked by undesired discoloration.

The extreme hydrophobicity of my tubes finds useful application in certain areas of filtration, such as coalescing or phase separation of emulsions, such as oil-in-water emulsions or removing oil droplets from a moisture-laden gas stream, and in other applications where hydrophobic filters are desirable. Further, my filter tubes may be used to temperatures of 250°C, while standard tubes are not suitable over 200°C.

My invention has been described in reference to the preferred embodiment; however, as will be apparent to a person skilled in the art, various modifications, changes and additions may be made without departing from the spirit and scope of my invention as described.

What I claim is:

1. A filter tube, which tube comprises a plurality of interrelated, randomly disposed inorganic glass fibers having interstices therebetween to define the porosity of the filter, the fibers having a diameter ranging from about 0.001 to about 10 microns and bonded at the junctions of the fiber crossover points with a bonding agent consisting essentially of a hardened silicone resin, the fibers interrelated to form a semirigid porous self-supporting fibrous filter tube.

2. The filter of claim 1 wherein the fibers are composed of borosilicate glass fibers.

3. The filter of claim 1 wherein the fibers have a diameter ranging from about 0.03 to about 8 microns.

4. The filter of claim 1 wherein the filter is in the form of a nonwoven semirigid self-supporting tube, the fibers at the ends of the tube adapted to be compressed together in a sealing relationship on the application of an axial force.

5. The filter of claim 1 wherein the bonding agent comprises from about 3 to 40% by weight of the filter.

6. The filter of claim 1 wherein the hardened silicone resin comprises a rigid cross-linked polysiloxane resin.

7. The filter tube of claim 1 which includes an outer porous filter sleeve, the filter sleeve containing a soluble dye therein to indicate the presence of liquid oil.

8. A filter tube, which tube comprises in combination: a tubular mass of interrelated, randomly disposed nonwoven glass fibers, the fibers having a diameter of from about 0.03 to 8 microns, the glass fibers bonded at the junctions of the fiber crossovers in the filter with a hardened cross-linked polysiloxane resin bonding agent in an amount ranging from about 3 to 50% by weight based on the weight of the filter, the glass fibers interrelated to form a semirigid self-supporting filter tube of the desired filtering porosity.

9. The filter tube of claim 8 which includes an outer porous filter sleeve composed of activated carbon which incorporates an organic soluble dye therein to indicate the presence of liquid oil.

10. A method of filtering a steam stream at a high temperature of up to about 168°C with reduced filter tube condensate retention, which method comprises: passing the stream of steam which is desired to be filtered at a temperature of up to about 168°C and a pressure of up to 100 psig through a filter material comprising a plurality of interrelated glass fibers, the fibers bonded at the junctions of their fiber crossovers with a hardened silicone resin bonding agent, the fibers interrelated to form a semirigid porous mass of desired filtering porosity.

11. The method of claim 10 wherein the filter is composed of borosilicate glass fibers having a diameter of from about 0.001 to about 10 microns, the borosilicate glass fibers bonded together by a rigid cross-linked silicone resin bonding agent.

* * * * *

UNITED STATES PATENT OFFICE
CERTIFICATE OF CORRECTION

PATENT NO. : 3,972,694
DATED : August 3, 1976
INVENTOR(S) : Brian Arthur Head

It is certified that error appears in the above-identified patent and that said Letters Patent are hereby corrected as shown below:

In column 6, claim 7, line 1 and claim 9, line 1, amend "outer" to read --inner--.

Signed and Sealed this

Eleventh Day of January 1977

[SEAL]

Attest:

RUTH C. MASON
Attesting Officer

C. MARSHALL DANN
Commissioner of Patents and Trademarks